United States Patent [19]
Vanderlaan et al.

[11] Patent Number: 5,998,498
[45] Date of Patent: *Dec. 7, 1999

[54] SOFT CONTACT LENSES

[75] Inventors: Douglas G. Vanderlaan, Jacksonville, Fla.; Ivan M. Nunez, Roanoke, Va.; Marcie Hargiss, Jacksonville, Fla.; Michele L. Alton, Roanoke, Va.; Susan Williams, Jacksonville, Fla.

[73] Assignee: Johnson & Johnson Vision Products, Inc., Jacksonville, Fla.

[*] Notice: This patent issued on a continued prosecution application filed under 37 CFR 1.53(d), and is subject to the twenty year patent term provisions of 35 U.S.C. 154(a)(2).

[21] Appl. No.: 09/033,347

[22] Filed: Mar. 2, 1998

[51] Int. Cl.⁶ ............... C08F 130/08; G02C 7/04
[52] U.S. Cl. .......... 523/107; 523/106; 524/547; 524/916; 526/279; 528/32; 351/160 H
[58] Field of Search ................... 523/106, 107; 524/547, 916; 526/279; 351/160 H; 528/32

[56] References Cited

U.S. PATENT DOCUMENTS

| | | |
|---|---|---|
| 3,808,178 | 4/1974 | Gaylord . |
| 4,495,313 | 1/1985 | Larsen . |
| 4,703,097 | 10/1987 | Wingler et al. ............ 523/107 |
| 4,786,657 | 11/1988 | Hammar et al. ............ 528/28 |
| 4,889,664 | 12/1989 | Kindt-Larsen et al. . |
| 4,954,586 | 9/1990 | Toyoshima et al. ............ 523/107 |
| 4,954,587 | 9/1990 | Mueller . |
| 5,010,141 | 4/1991 | Mueller . |
| 5,034,461 | 7/1991 | Lei et al. . |
| 5,039,459 | 8/1991 | Kindt-Larsen et al. . |
| 5,079,319 | 1/1992 | Mueller . |
| 5,115,056 | 5/1992 | Mueller et al. . |
| 5,258,490 | 11/1993 | Chang ............ 523/106 |
| 5,260,000 | 11/1993 | Nandu et al. . |
| 5,336,797 | 8/1994 | McGee et al. . |
| 5,358,995 | 10/1994 | Lai et al. . |
| 5,387,632 | 2/1995 | Lai et al. . |
| 5,387,662 | 2/1995 | Kunzler et al. . |
| 5,401,508 | 3/1995 | Manesis ............ 523/113 |
| 5,451,617 | 9/1995 | Lai et al. . |
| 5,486,579 | 1/1996 | Lai et al. . |
| 5,539,016 | 7/1996 | Kunzler et al. . |

FOREIGN PATENT DOCUMENTS

| | | |
|---|---|---|
| 61-123609 | 6/1986 | Japan . |
| 91/10155 | 11/1991 | WIPO . |
| 96/31792 | 10/1996 | WIPO . |

OTHER PUBLICATIONS

R. Baron et al., "The Role of Bulky Polysiloxanyalkyl Methacrylates in Polyurethane–Polysiloxane Hydrogels," J. of Appl. Poly. Sci., vol. 60, 1193–1199 (1996).

A. Domachke et al., "The Role of Bulky Polysiloxanylalkyl Methacrylates in Oxygen–Permeable Hydrogel Materials," J. Appl. Poly Sci., vol. 56, 317–324 (1995).

*Primary Examiner*—Andrew E. C. Merriam

[57] ABSTRACT

A soft contact lens comprising a silicone-hydrogel made by curing a reaction mixture comprising a silicone-containing monomer.

11 Claims, No Drawings

SOFT CONTACT LENSES

FIELD OF THE INVENTION

This invention relates to silicone hydrogels that are formed by curing a reaction mixture that comprises silicone-containing monomers, and are used to form soft contact lenses.

BACKGROUND OF THE INVENTION

A hydrogel is a hydrated cross-linked polymeric system that contains water in an equilibrium state. Hydrogels typically are oxygen permeable and biocompatible, making them a preferred material for producing biomedical devices and in particular contact or intraocular lenses.

Conventional hydrogels are prepared from monomeric mixtures predominantly containing hydrophilic monomers, such as 2-hydroxyethyl methacrylate (HEMA) or N-vinyl pyrrolidone (NVP). U.S. Pat. Nos. 4,495,313; 4,889,664 and 5,039,459 disclose the formation of conventional hydrogels. Oxygen permeability of these conventional hydrogel materials relates to the water content of the materials, and is typically below 20–30 barrers. For contact lenses made of the conventional hydrogel materials, that level of oxygen permeability is suitable for short-term wear of the contact lenses; however, that level of oxygen permeability may be insufficient to maintain a healthy cornea during long-term wear of contact lenses (e.g. 30 days without removal). Therefore, efforts have been made and continue to be made to increase the oxygen permeability of conventional hydrogels.

One known way to increase the oxygen permeability of the hydrogels is to add silicone-containing monomers to the hydrogel formulations, thereby making silicone hydrogels. Silicone-containing polymers generally have higher oxygen permeabilities than conventional hydrogels. Silicone hydrogels have been prepared by polymerizing mixtures containing at least one silicone-containing monomer and at least one hydrophilic monomer. Either the silicone-containing monomer or the hydrophilic monomer may function as a crosslinking agent (a crosslinking agent is a monomer having multiple polymerizable functionalities) or a separate crosslinking agent may be employed. The formation of silicone hydrogels has been disclosed in U.S. Pat. Nos. 4,954,587; 5,010,141; 5,079,319; 5,115,056; 5,260,000; 5,336,797; 5,358,995; 5,387,632; 5,451,617; and 5,486,579; and WO 96/31792.

U.S. Pat. No. 3,808,178 discloses the formation of copolymers of small silicone-containing monomers and various hydrophilic monomers.

U.S. Pat. No. 5,034,461 describes silicone hydrogels prepared from various combinations of silicone-polyurethane macromers and hydrophilic monomers such as HEMA or N,N-dimethyacrylamide (DMA). The addition of methacryloxypropyltris(trimethylsiloxy)silane (TRIS) reduced the modulus of such hydrogels, but in many examples the modulus was still higher than may be desired.

U.S. Pat. Nos. 5,358,995 and 5,387,632 describe hydrogels made from various combinations of silicone macromers, TRIS, n-vinyl pyrrolidone (NVP) and DMA. Replacing a substantial portion of the silicone macromer with TRIS reduced the modulus of the resulting hydrogels. Two publications from the same author, "The Role of Bulky Polysiloxanylalkyl Methacrylates in Polyurethane-Polysiloxane Hydrogels", J. Appl. Poly. Sci., Vol. 60, 1193–1199 (1996), and "The Role of Bulky Polysiloxanylalkyl Methacrylates in Oxygen-Permeable Hydrogel Materials", J. Appl. Poly. Sci., Vol. 56, 317–324 (1995) also describe experimental results indicating that the modulus of hydrogels made from reaction mixtures of silicone-macromers and hydrophilic monomers such as DMA decreases with added TRIS.

The use of methacryloxypropylbis(trimethylsiloxy) methylsilane (MBM) to make hard contact lenses was described in WO 9110155 and in JP 61123609.

When relatively high levels of bulky silicone-containing monomers such as TRIS are incorporated into the hydrogels made from silicone-containing macromers and hydrophilic monomers, the elasticity, or the speed at which the polymer returns to its original shape after stress can be reduced to an extent that is unacceptable to the contact lens wearer.

There still remains a need in the art for silicone hydrogels which are soft enough to make soft contact lenses, which possess high oxygen permeability, suitable water content, and sufficient elasticity, and are comfortable to the contact lens wearer.

SUMMARY OF THE INVENTION

This invention provides a silicone hydrogel prepared by curing a reaction mixture comprising a silicone-containing monomer having the following structure:

Structure I

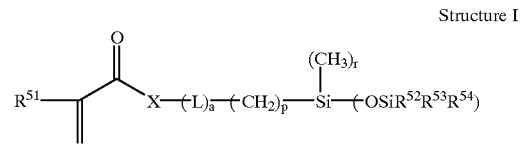

wherein $R^{51}$ is H or $CH_3$, q is 1 or 2 and for each q, $R^{52}$, $R^{53}$ and $R^{54}$ are independently ethyl, methyl, benzyl, phenyl or a monovalent siloxane chain comprising from 1 to 100 repeating Si—O units, p is 1 to 10, r=(3−q), X is O or $NR^{55}$, where $R^{55}$ is H or a monovalent alkyl group with 1 to 4 carbons, a is 0 or 1, and L is a divalent linking group which preferably comprises from 2 to 5 carbons, which may also optionally comprise ether or hydroxyl groups, for example, a polyethylene glycol chain.

In the preferred embodiment, the silicone hydrogel further comprises a second silicone-containing monomer and a hydrophilic monomer.

The advantages of this invention are that the use of the silicone-containing monomers of Structure I in a silicone hydrogel reduces the modulus of the hydrogel especially in hydrogels which comprise the silicone-containing monomers of Structure I and additional silicone-containing monomers which act as crosslinkers. The monomers of Structure I are effective at lowering the modulus of the silicone hydrogel when present in lesser amounts than for monomers described in the prior art, thereby allowing lower levels of silicone-containing monomers of Stucture I to be used while preserving the elasticity of the silicone hydrogels of this invention. It seems likely that this effect is because the siloxane group is less bulky than that of silicone-containing monomers used in the prior art, such as TRIS. The polymers produced according to this invention can be used to produce soft contact lenses which will provide high oxygen permeability, good elasticity, and can be produced economically and efficiently. The polymer of this invention can be used to make biomedical devices which require biocompatability and high oxygen permeability, preferably contact lenses.

DETAILED DESCRIPTION OF THE INVENTION

The term "monomer" used herein refers to low molecular weight compounds (i.e. typically having number average molecular weights less than 700) that can be polymerized, and to medium to high molecular weight compounds or polymers, sometimes referred to as macromonomers, (i.e. typically having number average molecular weights greater than 700) containing functional groups capable of further polymerization. Thus, it is understood that the terms "silicone-containing monomers" and "hydrophilic monomers" include monomers, macromonomers and prepolymers. Prepolymers are partially polymerized monomers or monomers which are capable of further polymerization.

A "silicone-containing monomer" is one that contains at least two [—Si—O—] repeating units, in a monomer, macromer or prepolymer. Preferably, the total Si and attached O are present in the silicone-containing monomer in an amount greater than 20 weight percent, and more preferably greater than 30 weight percent of the total molecular weight of the silicone-containing monomer.

Examples of the silicone-containing monomers of Structure I that can be used to form silicone hydrogels of this invention are methacryloxypropylbis(trimethylsiloxy) methylsilane, methacryloxypropylpentamethyldisiloxane, (3-methacryloxy-2-hydroxypropyloxy) propylbis (trimethylsiloxy)methylsilane, and mono-methacryloxypropyl terminated polydimethylsiloxanes such as Structure II:

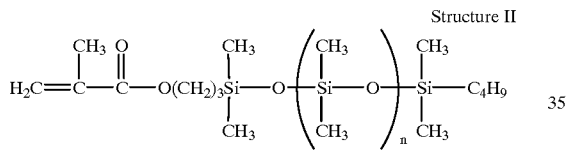

Structure II where b=0 to 100.

The preferred silicone-containing monomers of Structure I are methacryloxypropylbis(trimethylsiloxy)methylsilane, methacryloxypropylpentamethyldisiloxane, and mono-methacryloxypropyl terminated polydimethylsiloxanes. The more preferred silicone-containing monomers of Structure I are methacryloxypropylbis(trimethylsiloxy)methylsilane, and methacryloxypropylpentamethyldisiloxane. The most preferred silicone-containing monomer of Structure I is methacryloxypropylbis(trimethylsiloxy)methylsilane (MBM).

It is preferred that additional silicone-containing monomers are combined with the silicone-containing monomers of Stucture I to form the soft contact lenses of the invention. Any known silicone-containing monomers useful for making silicone hydrogels can be used in combination with the silicone-containing monomer of Strucure I to form the soft contact lenses of this invention. Many silicone-containing monomers useful for this purpose are disclosed in U.S. Ser. No. 08/948,128 filed Oct. 9, 1997, incorporated herein by reference. The preferred additional silicone-containing monomers combined with the silicone-containing monomers of Structure I to form the silicone hydrogels of this invention are the hydroxyalkylamine-functional silicone-containing monomers disclosed in U.S. Ser. No. 08/948,128 (VTN-0389) titled Silicone Hydrogel Polymers by Vanderlaan et al. filed concurrently herewith, and incorporated herein by reference. The preferred silicone-containing linear or branched hydroxyalkylamine-functional monomers comprising a block or random monomer of the following structure:

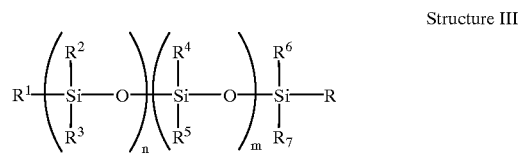

Structure III wherein:

n is 0 to 500 and m is 0 to 500 and (n+m)=10 to 500 and more preferably 20 to 250;

$R^2$, $R^4$, $R^5$, $R^6$ and $R^7$ are independently a monovalent alkyl, or aryl group, which may be further substituted with alcohol, ester, amine, ketone, carboxylic acid or ether groups, preferably unsubstituted monovalent alkyl or aryl groups; and $R^1$, $R^3$ and $R^8$ are independently a monovalent alky, or aryl group, which may be further substituted with an alcohol, ester, amine, ketone, carboxylic acid or ether group, preferably unsubstituted monovalent alkyl or aryl groups, or are the following nitrogen-containing structure:

Structure IV with the proviso that at least one of $R^1$, $R^3$, and $R^8$ are according to Structure IV, wherein $R^9$ is a divalent alkyl group such as —$(CH_2)_s$— where s is from 1 to 10, preferably 3 to 6 and most preferably 3;

$R^{10}$ and $R^{11}$ are independently H, a monovalent alkyl or aryl group which may be further substituted with an alcohol, ester, amine, ketone, carboxylic acid or ether group, or has the following structure:

Structure V where $R^{14}$, is H, or a monovalent polymerizable group comprising acryloyl, methacryloyl, styryl, vinyl, allyl or N-vinyl lactam, preferably H or methacryloyl; $R^{16}$ is either H, a monovalent alkyl or aryl group which can be further substituted with alcohol, ester, amine, ketone, carboxylic acid or ether groups, or a polymerizable group comprising acrylate, methacrylate, styryl, vinyl, allyl or N-vinyl lactam, preferably alkyl substituted with an alcohol or methacrylate; $R^{12}$, $R^{13}$ and $R^{15}$ are independently H, a monovalent alkyl or aryl, which can be further substituted with alcohol, ester, amine, ketone, carboxylic acid or ether groups, or $R^{12}$ and $R^{15}$, or $R^{15}$ and $R^{13}$ can be bonded together to form a ring structure, with the proviso that at least some of the Structure IV groups on the monomer comprises polymerizable groups. $R^{12}$, $R^{13}$ and $R^{15}$ are preferably H.

In alternative embodiments, the silicone hydrogels of this invention, comprising the silicone-containing monomers of Structure I, may comprise, with or without the addition of additional silicone-containing monomers, which are silicone-containing monomers not according to Structure I, preferably comprise hydrophilic monomers. The hydrophilic monomers optionally used to make the hydrogel polymer of this invention can be any of the known hydrophilic monomers disclosed in the prior art to make hydrogels.

The preferred hydrophilic monomers used to make the polymer of this invention may be either acrylic- or vinyl-containing. Such hydrophilic monomers may themselves be used as crosslinking agents. The term "vinyl-type" or "vinyl-containing" monomers refer to monomers containing the vinyl grouping (—CH=CH$_2$) and are generally highly reactive. Such hydrophilic vinyl-containing monomers are known to polymerize relatively easily. "Acrylic-type" or "acrylic-containing" monomers are those monomers containing the acrylic group:

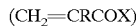

(CH$_2$=CRCOX)

wherein R is H or CH$_3$, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Hydrophilic vinyl-containing monomers which may be incorporated into the silicone hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art.

More preferred hydrophilic monomers which may be incorporated into the polymer of the present invention include hydrophilic monomers such as N,N-dimethyl acrylamide (DMA), 2-hydroxyethyl methacrylate (HEMA), glycerol methacrylate, 2-hydroxyethyl methacrylamide, N-vinylpyrrolidone (NVP), polyethyleneglycol monomethacrylate, methacrylic acid and acrylic acid with DMA being the most preferred.

Other monomers that can be present in the reaction mixture used to form the silicone hydrogel of this invention include ultra-violet absorbing monomers, reactive tints and the like. Additional processing aids such as release agents or wetting agents can also be added to the reaction mixture.

A polymerization catalyst is preferably included in the reaction mixture. The polymerization catalyst can be a compound such as lauroyl peroxide, benzoyl peroxide, isopropyl percarbonate, azobisisobutyronitrile, or the like, that generates free radicals at moderately elevated temperatures, or the polymerization catalyst can be a photoinitiator system such as an aromatic alpha-hydroxy ketone or a tertiary amine plus a diketone. Illustrative examples of photoinitiator systems are 2-hydroxy-2-methyl-1-phenyl-propan-1-one, and a combination of camphorquinone and ethyl 4-(N, N-dimethylamino)benzoate. The catalyst is used in the reaction mixture in catalytically effective amounts, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. The preferred initiator is 2-hydroxy-2-methyl-1-phenyl-propan-1-one, and the preferred method of polymerization initiation is UV light.

Typically after curing of the reaction mixture (which is defined as the silicone-containing monomers of Structure I and optional hydrophilic monomers and any other optional ingredients such as additional silicone-containing monomers, diluents, crosslinking agents, catalysts, release agents, tints etc. which are blended together prior to polymerization), the resulting polymer is treated with a solvent to remove the diluent (if used) or any traces of unreacted components, and hydrate the polymer to form the hydrogel. The solvent used may be water (or an aqueous solution such as physiological saline), or depending on the solubility characteristics of the diluent (if used) used to make the hydrogel of this invention and the solubility characteristics of any residual unpolymerized monomers, the solvent initially used can be an organic liquid such as ethanol, methanol, isopropanol, mixtures thereof, or the like, or a mixture of one or more such organic liquids with water, followed by extraction with pure water (or physiological saline) to produce the silicone hydrogel comprising a polymer of said monomers swollen with water. The silicone hydrogels after hydration of the polymers preferably comprise 2 to 50 weight percent water, more preferably 15 to 45 weight percent water, and most preferably 20 to 40 weight percent water of the total weight of the silicone hydrogel. These silicone hydrogels are particularly suited for making contact lenses or intraocular lenses, preferably soft contact lenses.

Various processes are known for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The preferred method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to thereby produce a polymer in the approximate shape of the final desired product. Then, this polymer mixture is optionally treated with a solvent and then water, producing a silicone hydrogel having a final size and shape which are quite similar to the size and shape of the original molded polymer article. This method can be used to form contact lenses and is further described in U.S. Pat. Nos. 4,495,313; 4,680,336; 4,889,664; and 5,039,459, incorporated herein by reference. After producing the silicone hydrogel, it is preferred that the lens be coated with a hydrophilic coating. Some methods of adding hydrophilic coatings to a lens have been disclosed in the prior art, including U.S. Pat. Nos. 3,854,982, 3,916,033, 4,920,184 and 5,002,794; WO 91/04283, and EPO 93810399.

The preferred range of the combined silicone-containing monomer of Structure I and additional silicone-containing monomers, if present in the reaction mixture, is from about 5 to 100 weight percent, more preferably about 10 to 90 weight percent, and most preferably about 15 to 80 weight percent of the reactive components in the reaction mixture. The preferred range of optional hydrophilic monomer if present in the above invention is from about 5 to 80 weight percent, more preferably about 10 to 60 weight percent, and most preferably about 20 to 50 weight percent of the reactive components in the reaction mixture. The preferred range of diluent is from about 0 to 70 weight percent, more preferably about 0 to 50 weight percent, and most preferably about 0 to 20 weight percent of the total reaction mixture. The amount of diluent required varies depending on the nature and relative amounts of the reactive components.

In preferred combinations of reactive components 10 to 60, more preferably 15 to 50 weight percent of the reactive components is silicone-containing monomer, 20 to 50 weight percent of the reactive components is silicone-containing monomer of Structure I, 10 to 50 percent of the reactive components is a hydrophilic monomer, more preferably DMA, 0.1 to 1.0 percent of the reactive components is a UV or visible light-active photoinitiator and 0 to 20 weight percent of the total reaction mixture is a secondary or tertiary alcohol diluent, more preferably a tertiary alcohol. The more preferred embodiments comprise silicone-containing monomer of Structure I, hydrophilic monomer and additional silicone-containing monomer, preferably according to Structure III. The most preferred embodiments comprise the preferred silicone-containing monomers of Structure I, hydrophilic monomers and additional silicone-containing monomers according to Structure III which were described above.

The reaction mixtures of the present invention can be formed by any of the methods known to those skilled in the art, such as shaking or stirring, and used to form polymeric articles or devices by the methods described earlier. For some monomer reaction mixtures it is preferred to polymerize the reaction mixtures at temperatures slightly above room temperature, such as 30–40° C., or below room temperature, such as 0–10° C., so as to prevent phase separation of the components.

The Examples below further describe this invention. Some of the materials that are employed in the Examples are identified as follows:

| | |
|---|---|
| "DAROCURE 1173" | 2-hydroxy-2-methyl-1-phenyl-propan-1-one, |
| "DMA" | N,N-dimthylacrylamide |
| "MBM" | 3-methacryloxypropylbis(trimethylsiloxy)methyl-silane. |

PREPARATION 1

Preparation of Polysiloxane Monomer 500 grams of α,ω-bisaminopropyl polydimethylsiloxane (5000 MW) and 68 grams of glycidyl methacrylate were combined and heated with stirring at 100° C. for 10 hours. The product was extracted five times with 1500 ml of acetonitrile to remove residual glycidyl methacrylate to give a clear oil. IR: 3441, 2962, 1944, 1725, 1638, 1612, 1412 cm$^{-1}$. This product will be referred to as "the reaction product of glycidyl methacrylate and 5000 MW α,ω-bisaminopropyl polydimethylsiloxane" or alternatively bis(N,N-bis-2-hydroxy-3-methacryloxypropyl)aminopropyl polydimethylsiloxane.

EXAMPLE 1

38.2 parts by weight of the product of PREPARATION 1 was combined with 28.8 parts MBM, 33 parts DMA and 1 part DAROCUR 1173 and diluted with 3-methyl-3-pentanol to make a reaction mixture in which the diluent made up 9% of the mass of the complete reaction mixture. The resulting reaction mixture was a clear, homogeneous solution. Polypropylene contact lens molds were filled, closed and irradiated with a total of 3.2 J/cm2 UV light from a fluorescent UV source over a 30-minute period. The molds were opened and the lenses were released into isopropanol and then transferred into deionized water.

The lenses were clear and had a tensile modulus of 205±12 g/mm2, an elongation at break of 133±37%, and an equilibrium water content of 24.2±0.2%. Tensile properties were determined using an Instron™ model 1122 tensile tester. Equilibrium Water Contents (EWC) were determined gravimetrically and are expressed as:

%EWC=100×(mass of hydrated lens−mass of dry lens)/mass of hydrated lens

EXAMPLES 2–16

Reaction mixtures were made using the formulation of EXAMPLE 1, but with amounts listed in TABLE 1. All reaction mixtures and lenses were clear.

TABLE 1

Silicone Hydrogel Formulations and Properties

| | Example | | | |
|---|---|---|---|---|
| | 1 | 2 | 3 | 4 |
| Composition | | | | |
| Prep Macromer | 38.2 | 33.5 | 21.6 | 22.3 |
| MBM | 28.8 | 33.5 | 39.4 | 44.7 |
| DMA | 33 | 33 | 33 | 33 |
| Darocur | 0.4 | 0.4 | 0.4 | 0.4 |
| % of Diluent | 9 | 7 | 5 | 4 |
| EWC (%) | 24.2 ± 0.2 | 23.3 ± 0.3 | 22.4 ± 0.2 | 24.2 ± 0.3 |
| Modulus (psi) | 205 ± 12 | 178 ± 11 | 136 ± 4 | 109 ± 3 |
| % Elongation | 133 ± 37 | 156 ± 39 | 168 ± 48 | 200 ± 58 |
| Dk (barrers) | 142.3 | 144.9 | 145.1 | 109.3 |
| | Example | | | |
| | 5 | 6 | 7 | 8 |
| Composition | | | | |
| Prep Macromer | 37.1 | 32.5 | 26.8 | 21.7 |
| MBM | 27.9 | 32.5 | 38.2 | 43.3 |
| DMA | 35 | 35 | 35 | 35 |
| Darocur | 0.4 | 0.4 | 0.4 | 0.4 |
| % of Diluent | 10 | 7 | 5 | 11 |
| EWC (%) | 26.1 ± 0.3 | 25.8 ± 0.3 | 25.8 ± 0.3 | 25.8 ± 0.1 |
| Modulus (psi) | 179 ± 5 | 215 ± 7 | 132 ± 6 | 101 ± 4 |
| % Elongation | 151 ± 42 | 106 ± 30 | 195 ± 65 | 179 ± 47 |
| Dk (barrers) | 118.8 | 129.6 | 116.5 | 107.9 |
| | Example | | | |
| | 9 | 10 | 11 | 12 |
| Composition | | | | |
| Prep Macromer | 35.4 | 31 | 25.5 | 20.7 |
| MBM | 26.6 | 31 | 36.5 | 41.3 |
| DMA | 38 | 38 | 38 | 38 |
| Darocur | 0.4 | 0.4 | 0.4 | 0.4 |
| % of Diluent | 12 | 7 | 7 | 5 |
| EWC (%) | 29.4 ± 0.3 | 30.0 ± 0.3 | 26.6 ± 0.2 | 26.7 ± 0.3 |
| Modulus (psi) | 215 ± 7 | 175 ± 7 | 132 ± 51 | 106 ± 4 |
| % Elongation | 99 ± 22 | 132 ± 40 | 166 ± 51 | 204 ± 55 |
| Dk (barrers) | 106.6 | 115.7 | 104.9 | 100.3 |

TABLE 1-continued

| | Example | | | |
|---|---|---|---|---|
| | 13 | 14 | 15 | 16 |
| Composition | | | | |
| Prep Macromer | 34.2 | 30 | 24.7 | 20 |
| MBM | 25.8 | 30 | 35.3 | 40 |
| DMA | 40 | 40 | 40 | 40 |
| Darocur | 0.4 | 0.4 | 0.4 | 0.4 |
| % of Diluent | 12 | 11 | 8 | 9 |
| EWC (%) | 32.1 ± 0.1 | 31.2 ± 0.2 | 31.6 ± 0.3 | 31.7 ± 0.2 |
| Modulus (psi) | 218 ± 11 | 170 ± 6 | 131 ± 4 | 95 ± 3 |
| % Elongation | 110 ± 34 | 130 ± 51 | 185 ± 53 | 203 ± 47 |
| Dk (barrers) | 112.4 | 104.6 | 90.8 | 92.3 |

*% of the total reaction mixture of reactive components, and diluent.

EXAMPLE 17

21.5% of α,ω-bismethacryloxypropyl polydimethylsiloxane with an average molecular weight of 5000 g/mol was combined with 42.5% MBM, 35% DMA and 1% DAROCUR 1173 and diluted with 3-methyl-3-pentanol to give a clear solution containing 22 weight % diluent. Lenses were made following the procedure of EXAMPLE 1. The lens properties are shown in TABLE 2.

EXAMPLE 18

Lenses were made using the procedure and reaction mixture described in EXAMPLE 17, but with methacryloxypropylpentamethyl disiloxane (MPD) in place of MBM. The lens properties are shown in TABLE 2.

COMPARATIVE EXAMPLE 1

A reaction mixture was made using the formulation of EXAMPLE 17, but with TRIS in place of MBM, and with 20% diluent. Lenses were made following the procedure of EXAMPLE 1. The lens properties, shown in TABLE 2, show that the use of MBM (EXAMPLE 17) or methacryloxypropylpentamethyl disiloxane (MPD) (EXAMPLE 18) gave lower moduli when used in place of TRIS.

TABLE 2

Compositions and Properties of Silicone Hydrogel Polymers

| | Example 17 | Comp. Ex. 1 | Example 18 |
|---|---|---|---|
| PDMS* | 21.5 | 21.5 | 21.5 |
| TRIS | | 42.5 | |
| MBM | 42.5 | | |
| MPD | | | 42.5 |
| DMA | 35 | 35 | 35 |
| Monomer/Diluent | 78/22 | 80/20 | 78/22 |
| Modulus | 65 ± 2 psi | 87 ± 3 psi | 55 ± 2 psi |
| Elongation at break | 278 ± 60% | 307 ± 88% | 263 ± 81% |
| Dk | 110 barrers | 147 barrers | 75.6 barrers |
| EWC | 28.2 ± 0.3% | 28.9 ± 0.3% | 31.0 ± 0.3% |

PDMS*= α,ω-bismethacryloxypropyl polydimethylsiloxane, ave. MW of 5000 g/mol

EXAMPLE 19

29.0% of α,ω-bismethacryloxypropyl polydimethylsiloxane with an average molecular weight of 5000 g/mol was combined with 35% mono-methacryloxypropyl terminated PDMS (T1, Structure II, MW=800 to 1000), 35% DMA and 1% DAROCUR 1173 and diluted with 3-methyl-3-pentanol to give a clear solution containing 23.0 weight % diluent. Lenses were made following the procedure of EXAMPLE 1. The lens properties are shown in TABLE 3.

EXAMPLE 20

29.0% of α,ω-bismethacryloxypropyl polydimethylsiloxane with an average molecular weight of 5000 g/mol was combined with 35% (3-methacryloxy-2-hydroxypropyloxy) propylbis(trimethylsiloxy)methylsilane (T2), 35% DMA and 1% DAROCUR 1173 and diluted with 3-methyl-3-pentanol to give a clear solution containing 37.6 weight % diluent. Lenses were made following the procedure of EXAMPLE 1. The lens properties are shown in TABLE 3.

TABLE 3

Compositions and Properties of Silicone Hydrogel Polymers

| | Example 19 | Example 20 |
|---|---|---|
| PDMS | 29.0 | 29.0 |
| T1 | 35.0 | |
| T2 | | 35.0 |
| DMA | 35.0 | 35.0 |
| DAROCUR 1173 | 1.0 | 1.0 |
| %/Diluent | 23.0 | 37.6 |
| Modulus | 193 ± 15 psi | 175 ± 11 psi |
| Elongation at break | 87.9 ± 42% | 108 ± 54% |
| Dk | 171 barrers | 94 barrers |
| EWC | 31.1 ± 0.2% | 33.4 ± 0.2% |

The Examples show that the contact lenses made using the silicone-containing monomers of Structure I provide contact lenses which are clear and have a lower modulus than the contact lenses made according to the Comparative Examples. A low modulus is desireable to provide contact lenses which are comfortable when worn.

This invention has been described with reference to particular embodiments; however, additional embodiments which are within the scope of the claims would be apparent to a person of ordinary skill in the art.

We claim:

1. A soft contact lens comprising a silicone-hydrogel made by curing a reaction mixture comprising a silicone-containing monomer having the structure:

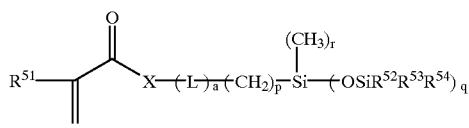

wherein $R^{51}$ is H or $CH_3$, q is 1 or 2 and for each q, $R^{52}$, $R^{53}$, and $R^{54}$ are independently ethyl, methyl, benzyl, phenyl or a monovalent siloxane chain comprising from 1 to 100 repeating Si—O units, p is 1 to 10, r=(3−q), X is O or $NR^5$, where $R^5$ is H or a monovalent alkyl group with 1 to 4 carbons, a is 0 or 1, and L is a divalent linking group a hydrophilic monomer, and a hydroxyalkylamine-functional silicone-containing monomer.

2. The soft contact lens of claim 1 wherein said silicone-containing monomer is selected from the group consisting of methacryloxypropylbis(trimethylsiloxy)methylsilane, methacryloxypropylpentamethyldisiloxane, (3-methacryloxy-2-hydroxypropyloxy) propylbis (trimethylsiloxy)methylsilane, and mono-methacryloxypropyl terminated polydimethylsiloxanes of the structure:

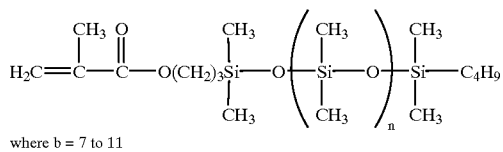

where b=7 to 11.

3. The soft contact lens of claim 1 wherein said silicone-containing monomer is methacryloxypropylbis (trimethylsiloxy)methylsilane.

4. A soft contact lens comprising a silicone-hydrogel made by curing a reaction mixture comprising a silicone-containing monomer having the structure:

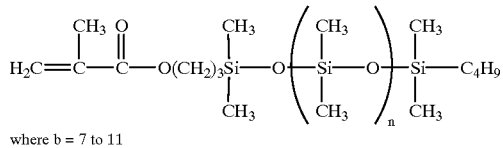

where b=7 to 11.

5. The soft contact lens of claim 4, further comprising a hydrophilic monomer.

6. The soft contact lens of claim 1 or claim 5 wherein said hydrophilic monomer is selected from the group consisting of N,N-dimethyl acrylamide, 2-hydroxyethyl methacrylate, glycerol methacrylate, 2-hydroxyethyl methacrylamide, N-vinylpyrrolidone, polyethyleneglycol monomethacrylate, methacrylic acid and acrylic acid.

7. The soft contact lens of claim 1 or claim 4 wherein said reaction mixture further comprises a diluent.

8. The soft contact lens of claim 1 or claim 4 wherein said diluent is a tertiary alcohol.

9. The soft contact lens of claim 1 or claim 5 wherein the combined total of said silicone-containing monomer of and said additional silicone-containing monomer in said reaction mixture is from about 5 to 100 weight percent of the reactive components in said reaction mixture, and said hydrophilic monomer is present from about 5 to 80 weight percent of the reactive components in said reaction mixture.

10. The soft contact lens of claim 1 or claim 5 wherein the combined total of said silicone-containing monomer of and said additional silicone-containing monomer in said reaction mixture is from about 10 to 60 weight percent of the reactive components in said reaction mixture, and said hydrophilic monomer is present from about 10 to 50 weight percent of the reactive components in said reaction mixture.

11. The soft contact lens of claim 1 or claim 5 wherein said reaction mixture comprises methacryloxypropylbis (trimethylsiloxy)methylsilane, N,N-dimethyl acrylamide, and the reaction product of glycidyl methacrylate and 5000 MW α,ω-bisaminopropyl polydimethylsiloxane.

* * * * *